United States Patent
Ozawa

(10) Patent No.: US 10,162,584 B1
(45) Date of Patent: Dec. 25, 2018

(54) PRINTING SYSTEM AND PROGRAM

(71) Applicant: KONICA MINOLTA, INC., Chiyoda-ku, Tokyo (JP)

(72) Inventor: Tomohiro Ozawa, Tama (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/010,742

(22) Filed: Jun. 18, 2018

(30) Foreign Application Priority Data

Jun. 22, 2017 (JP) ................................. 2017-122408

(51) Int. Cl.
| | |
|---|---|
| G06K 15/00 | (2006.01) |
| G06F 3/12 | (2006.01) |
| H04L 29/06 | (2006.01) |

(52) U.S. Cl.
CPC .......... *G06F 3/1238* (2013.01); *G06F 3/1222* (2013.01); *G06F 3/1225* (2013.01); *G06F 3/1231* (2013.01); *H04L 63/0884* (2013.01)

(58) Field of Classification Search
CPC .... G06F 3/1238; G06F 3/1231; G06F 3/1225; G06F 3/1222; H04L 63/0884
USPC ....................................................... 358/1.14
See application file for complete search history.

(56) References Cited

U.S. PATENT DOCUMENTS

| | | | | |
|---|---|---|---|---|
| 8,264,703 B2* | 9/2012 | Isoda | .................... | G06F 3/1222 358/1.14 |
| 8,279,462 B2* | 10/2012 | Sugiyama | ............. | G06F 3/1207 358/1.1 |
| 9,335,959 B2* | 5/2016 | Kawanishi | ............ | G06F 3/1238 |

FOREIGN PATENT DOCUMENTS

JP 2010-108347 A 5/2010

* cited by examiner

*Primary Examiner* — Neil R McLean
(74) *Attorney, Agent, or Firm* — Buchanan Ingersoll & Rooney PC

(57) ABSTRACT

A printing system includes: an information processing terminal; a print server; a printing device; and an authentication server, wherein the information processing terminal uses a server printer driver for issuing a printing instruction, the printing device transmits authentication information to the print server, the print server requests the authentication server to perform user authentication, and the printing device performs printing, the information processing terminal including: a hardware processor that creates a second print job; and a second print job transmitter that transmits the second print job to the printing device, the printing device including: a second print job receiver that receives the second print job from the information processing terminal; the hardware processor that: recognizes that the printing system is in a non-server transit state; and instructs directly the authentication server to perform the user authentication; and a printer that performs printing based on the second print job.

12 Claims, 12 Drawing Sheets

US 10,162,584 B1

PRINTING SYSTEM AND PROGRAM

The entire disclosure of Japanese patent Application No. 2017-122408, filed on Jun. 22, 2017, is incorporated herein by reference in its entirety.

BACKGROUND

Technological Field

The present invention relates to a printing system and a program that issue a printing instruction via a print server and perform printing based on the printing instruction.

Description of the Related Art

In recent years, as a printing system capable of instructing any one of printing devices connected to a network to perform printing while maintaining security, printing systems are spreading corresponding to so-called ubiquitous printing using application groups such as PageScope Enterprise Suite (PSES).

In this ubiquitous printing, an information processing terminal such as a client personal computer (client PC) first inputs a print job including user identification information for identifying a user to a print server (hereinafter also referred to as a ubiquitous server). Thereafter, when the user performs a login operation on any one of the printing devices connected to this ubiquitous server via the network, the printing device transmits the login information to the ubiquitous server and instructs the ubiquitous server to request the authentication server to perform user authentication. When the user who has performed the login operation is authenticated by the authentication server, the ubiquitous server transmits a print job including identification information of the same user as the authenticated user to the printing device. Then, the printing device performs printing on the basis of this print job.

However, if the ubiquitous server has gone down, in particular, a user having an information processing terminal in which only a driver for ubiquitous printing has been installed cannot transmit a print job until the ubiquitous server is restored. If desiring to print immediately, the user needs to, for example, download a printer driver of a printing device to be used for printing (hereinafter also referred to as a local printer driver) and set the internet protocol (IP) of the printing device to the local printer driver.

In addition, when printing using the local printer driver, cloud printing, or the like is performed instead of ubiquitous printing while the ubiquitous server is down, the user authentication to be executed with the authentication server in the ubiquitous printing cannot be executed for such printing.

Therefore, in the printing system, even if the ubiquitous server goes down, it is necessary to instruct directly the printing device to perform printing while maintaining the same security as when this ubiquitous server is in operation.

For example, JP 2010-108347 A discloses a technique of caching authentication information in a multifunction peripheral (MFP) in order to enable printing from a print server even when the authentication server goes down. In this technique, the authentication information is cached when the authentication server is in operation, and this cached authentication information is used when the authentication server is down.

In JP 2010-108347 A, since the authentication information is cached in the MFP, there is a problem that a burden is placed on a memory etc. of the MFP. Also, there is a possibility that the authentication information leaks from the MFP so that there is a security problem in the printing system.

SUMMARY

The present invention has been made to solve the above-described problems, and an object thereof is to provide a printing system and a program which can instruct directly a printing device to perform printing while maintaining the same security as when the print server is in operation even when the print server is down in printing based on a printing instruction through the print server.

To achieve the abovementioned object, according to an aspect of the present invention, a printing system reflecting one aspect of the present invention comprises an information processing terminal; a print server; a printing device; and an authentication server, wherein the information processing terminal uses a server printer driver for issuing a printing instruction via the print server so as to create a first print job including identification information of a user permitted to issue printing instruction via the print server and transmits the first print job to the print server, the printing device transmits authentication information of the user to the print server, and instructs the print server to request the authentication server to perform user authentication based on the authentication information, when receiving the authentication information, the print server, based on the instruction from the printing device, requests the authentication server to perform the user authentication, and transmits, to the printing device, the first print job received from the information processing terminal and including identification information of a same user as the authenticated user when the user is authenticated by the authentication server, and the printing device performs printing based on the first print job received from the print server, the information processing terminal comprising: a hardware processor that creates a second print job including a direct printing instruction indicating that an instruction is issued directly to the printing device to perform printing without passing through the print server and the identification information of the user by using a local printer driver that instructs directly the printing device to perform printing; and a second print job transmitter that transmits the second print job directly to the printing device by using the local printer driver, the printing device comprising: a second print job receiver that receives the second print job directly from the information processing terminal; the hardware processor that: recognizes that the printing system is in a non-server transit state in which the second print job is transmitted to the printing device without passing through the print server, based on the direct printing instruction included in the second print job received by the second print job receiver; and instructs directly the authentication server to perform the user authentication based on the authentication information of the user instead of instructing the print server to request the authentication server to perform user authentication based on the authentication information, when receiving the authentication information of the user, in a case where the hardware processor recognizes that the printing system is in the non-server transit state; and a printer that performs printing based on the second print job including the identification information of the same user as the authenticated user when receiving information that the user has been authenticated from the authentication server as a result of the user authentication which the hardware processor has instructed the authentication server to perform.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 11 is a flowchart showing processing performed by the multifunction peripheral when a user logs in.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
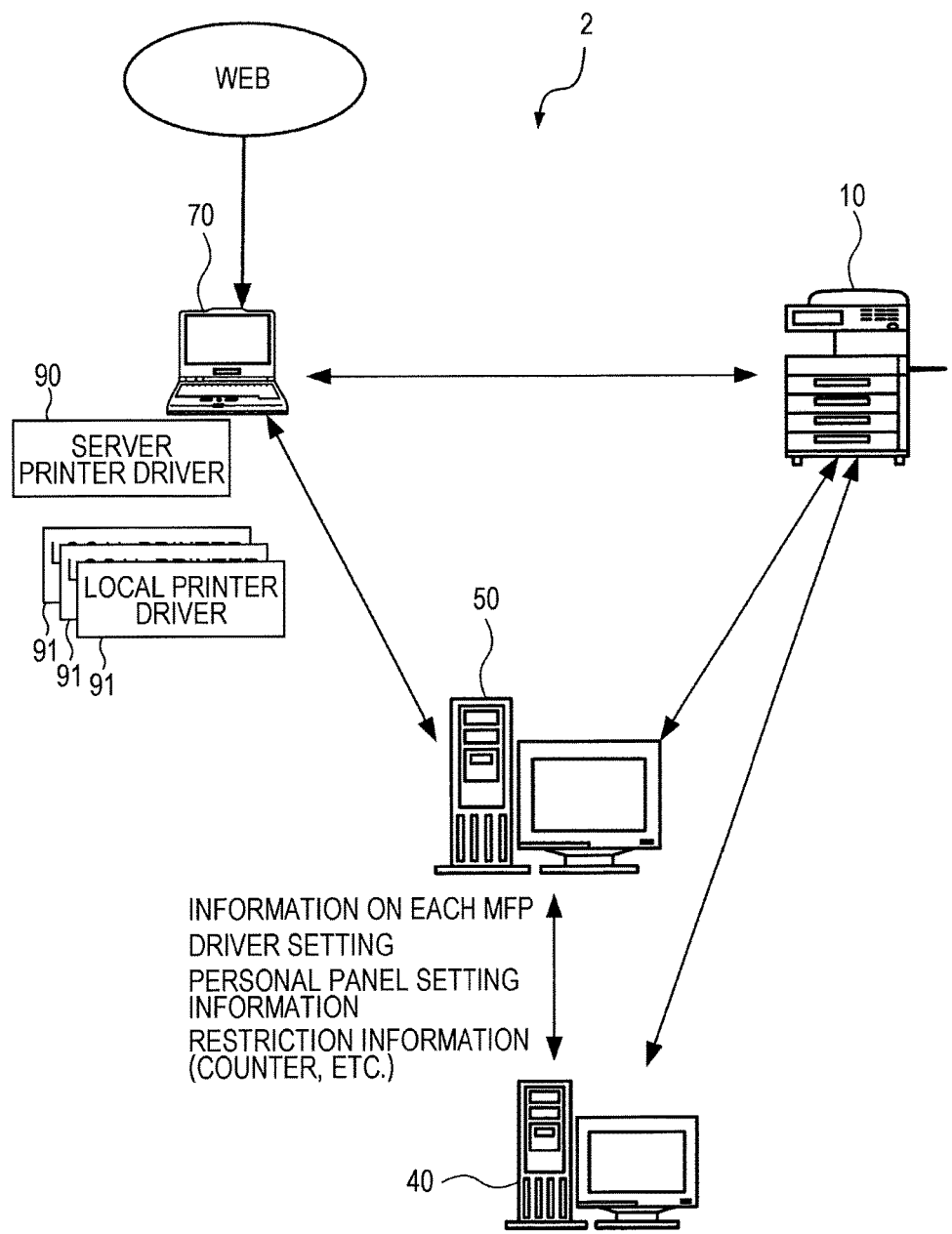
FIG. 1 is a schematic diagram showing a configuration example of a printing system according to an embodiment of the present invention.

FIG. 1 shows a configuration example of a printing system 2 according to an embodiment of the present invention. The printing system 2 constituted by connecting an information processing terminal 70 such as a personal computer used by a user (hereinafter also referred to as a personal computer (PC)), a multifunction peripheral 10 as a printing device, a print server 50, and an authentication server 40 through a network such as a local area network (LAN). The PC 70 and the multifunction peripheral 10 may be one each, but usually a plurality of apparatuses are connected respectively.

This printing system 2 is a printing system corresponding to so-called ubiquitous printing. To be specific, one PC 70 first inputs a print job including user identification information for identifying the user to the print server 50 as a ubiquitous server. Thereafter, the user inputs an identification (ID), a password, or the like as authentication information to one multifunction peripheral 10, thereby performing a login operation to the multifunction peripheral 10. The multifunction peripheral 10 transmits the authentication information of the user to the print server 50 and instructs the print server 50 to request the authentication server 40 to perform user authentication. When the user who has performed the login operation is authenticated by the authentication server 40, the print server 50 transmits a print job including identification information of the same user as the authenticated user to the multifunction peripheral 10. Then, the multifunction peripheral 10 performs printing based on this print job.

In order to execute the ubiquitous printing, the PC 70 has a function of creating a print job (first print job) and sending the print job to the print server 50, and also has a function of creating a print job (second print job) to be transmitted directly to each multifunction peripheral 10 without passing through the print server 50, and directly transmitting the print job to each multifunction peripheral 10. Here, transmitting the print job directly to the multifunction peripheral 10 means transmitting the print job from the PC 70 to the multifunction peripheral 10 without passing through the print server 50, and for example, includes transmitting the print job to the multifunction peripheral 10 via another device other than the print server 50 as a relay point.

In the PC 70, a server printer driver 90 which has a function of creating a first print job and transmitting the job to the print server 50 is installed. Further in the PC 70, a local printer driver 91 dedicated to each multifunction peripheral 10, which has a function of creating a second print job and sending the job to the multifunction peripheral 10 is installed at the time of installation of the server printer driver 90 or the like.

The multifunction peripheral 10 is an image forming apparatus having a function of performing various jobs such as a copy job for printing, on a recording sheet, an image based on image data obtained by optically reading a document with a scanner, a save job that saves the image data of the read document as a file or the like, a transmission job for transmitting the image data of the read document to the outside as a file or the like, a printing job for printing and outputting an image on recording paper on the basis of data of the print job received from the print server 50 or the PC 70, a facsimile job for sending and receiving image data in accordance with a facsimile procedure. Hereinafter, the multifunction peripheral 10 is also referred to as an MFP. Instead of the multifunction peripheral 10, a single-function printing device that supports only printing jobs may be used.

The print server 50 as a ubiquitous server receives a print job (first print job) from each PC 70 and holds the received first print job. Then, when instructed to request user authentication from the authentication server 40 by the multifunction peripheral 10 logged in by a user, the print server 50 requests the authentication server 40 to perform user authentication. When the user is authenticated by the authentication server 40, the print server 50 transmits the print job of the user to the multifunction peripheral 10 which is logged in.

Upon receiving a request for user authentication from the print server 50, the authentication server 40 performs user authentication based on the authentication information included in the request.

Figure 2:
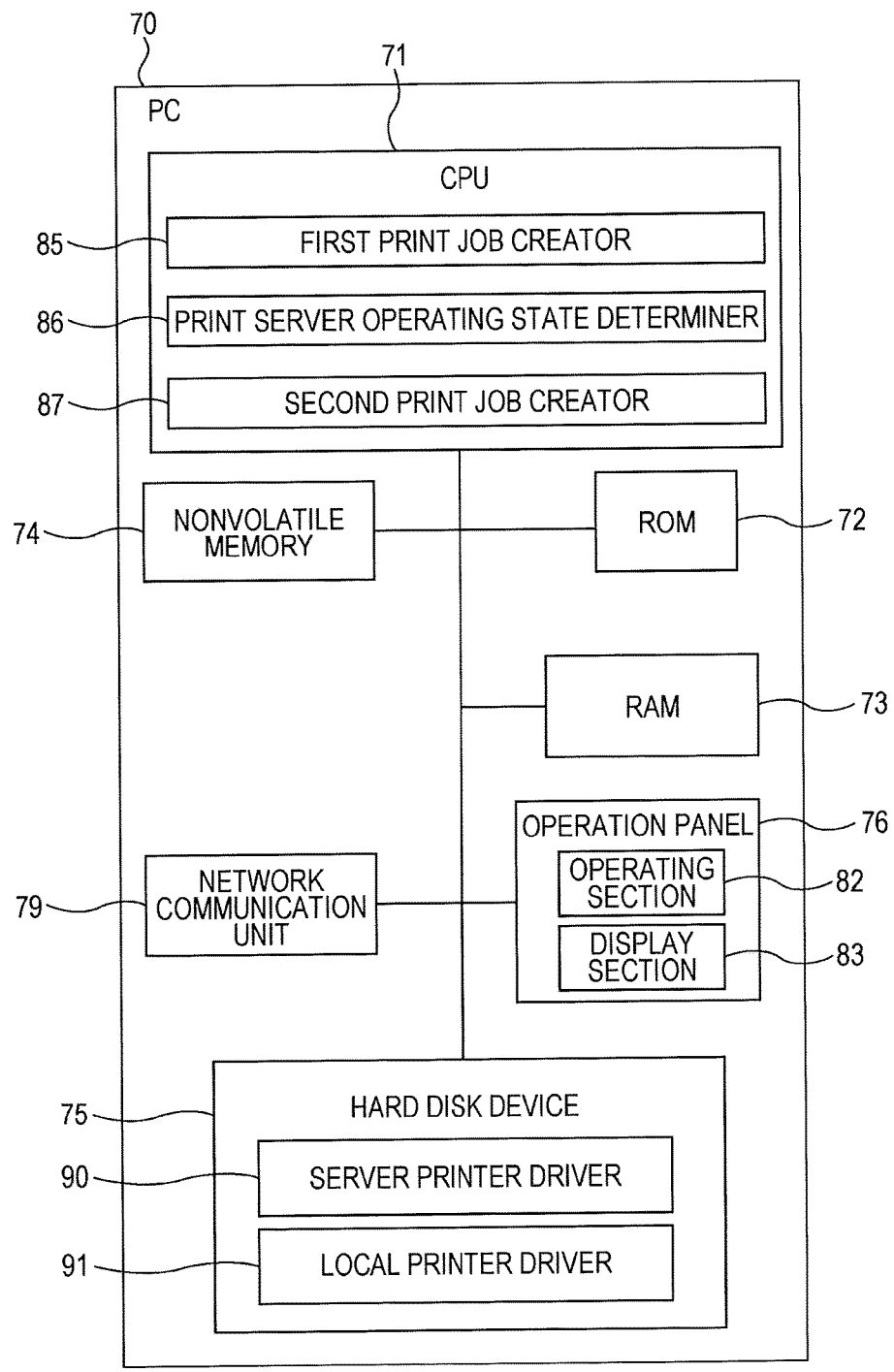
FIG. 2 is a block diagram showing a schematic configuration of a PC.

FIG. 2 is a block diagram showing a schematic configuration of the PC 70. The PC 70 has a central processing unit (CPU) 71 which comprehensively controls the operation of the PC 70. A read only memory (ROM) 72, a random access memory (RAM) 73, a nonvolatile memory 74, a hard disk device 75, an operation panel 76, a network communication unit 79, and the like are connected to the CPU 71 via a bus.

The CPU 71 is based on an operating system (OS) program and executes middleware, application programs, and the like in addition. The CPU 71 also functions as a first print job creator 85, print server operating state determiner 86, and second print job creator 87, which will be described later.

Various programs are stored in the ROM 72, and each function of the PC 70 is achieved by the CPU 71 executing various types of processing according to these programs.

The RAM 73 is used as a work memory for temporarily storing various data and an image memory for storing image data when the CPU 71 executes processing based on the program.

The nonvolatile memory 74 is a memory in which stored contents are not destroyed even when the power is turned off (flash memory), and is used for storing various setting information and the like. In particular, the nonvolatile memory 74 stores the identification information of the user of the PC 70.

The hard disk device 75 is a large-capacity nonvolatile storage device, and stores various types of programs and data in addition to print job data, image data, and the like. Further, the hard disk device 75 stores the server printer driver 90 and the local printer driver 91 dedicated to each multifunction peripheral 10.

The operation panel 76 includes an operating section 82 and a display section 83. The display section 83 functions to display various operation screens, and is composed of a liquid crystal display or the like. The operating section 82 includes various hard keys such as a start button and a numeric keypad for receiving various operations from the user and a touch screen provided on the display surface of a display section 83. Further, the operation panel 76 receives a printing instruction from the user.

The network communication unit 79 functions to communicate with various external devices in addition to each multifunction peripheral 10 and the print server 50 through the network. In particular, the network communication unit 79 has a function of transmitting a first print job created by using the server printer driver 90 to the print server 50, and a function of transmitting the second print job created by using the local printer driver 91 to the multifunction peripheral 10, as the second print job transmitter.

The first print job creator 85 functions to create a first print job to be transmitted to the print server 50 by using the server printer driver 90. The first print job includes identification information of a user (user of the PC 70) permitted to perform ubiquitous printing.

The print server operating state determiner 86 has a function of determining the operating state of the print server 50 via the network at the time of executing ubiquitous printing or periodically.

The second print job creator 87 has a function of creating a second print job to be directly transmitted to the multifunction peripheral 10 corresponding to the local printer driver 91 by using the local printer driver 91 in a case where the print server operating state determiner 86 determines that the print server 50 is not normally operating, or the like. The second print job includes a direct printing instruction indicating that an instruction is issued directly to the multifunction peripheral 10 to perform printing without passing through the print server 50 and identification information on the user permitted to execute printing based on the second print job (the user of the PC 70).

Figure 3:
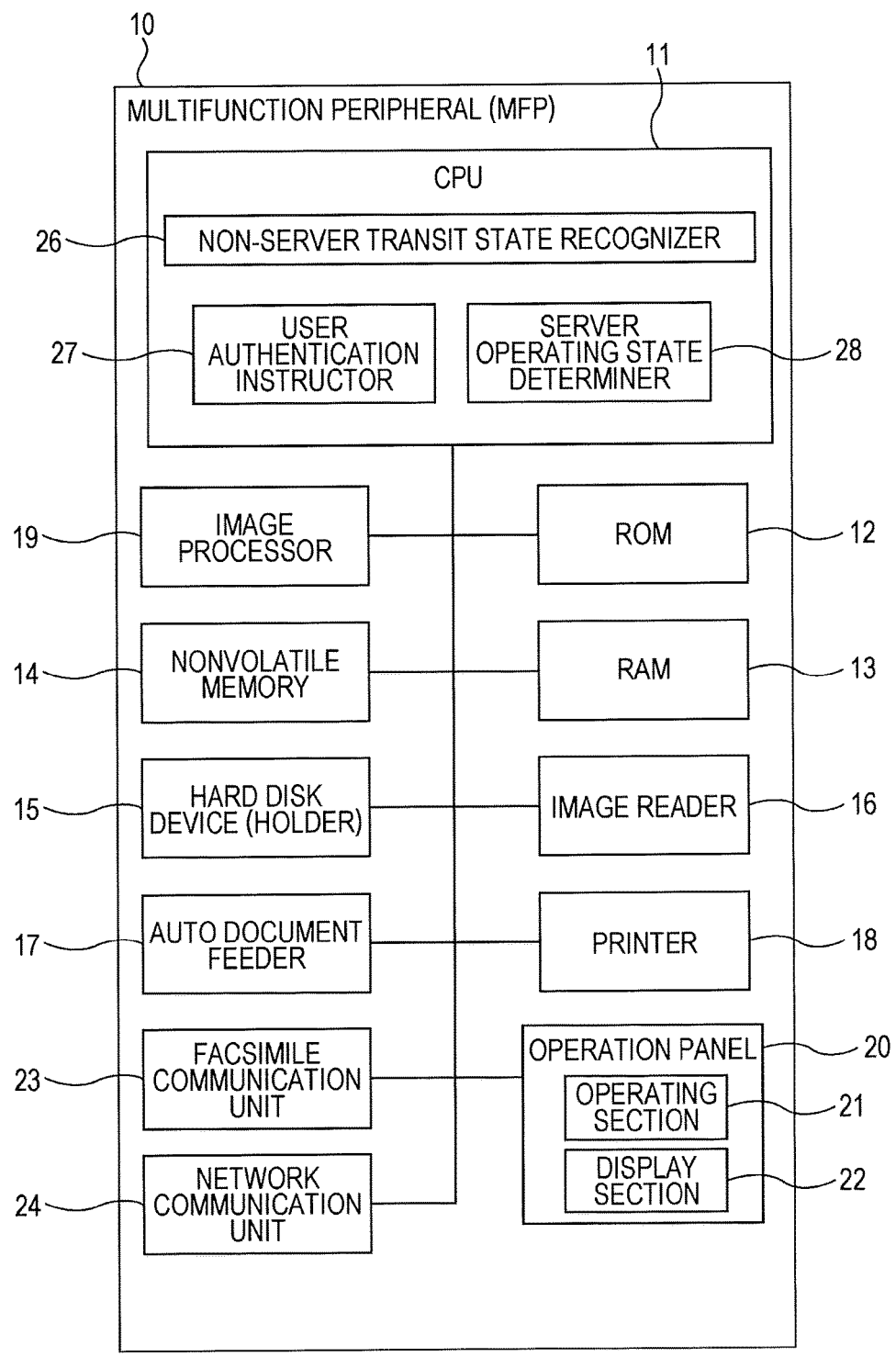
FIG. 3 is a block diagram showing a schematic configuration of a multifunction peripheral.

FIG. 3 is a block diagram showing a schematic configuration of the multifunction peripheral 10. The multifunction peripheral 10 has a CPU 11 that comprehensively controls the operation of the multifunction peripheral 10. A ROM 12, a RAM 13, a nonvolatile memory 14, a hard disk device 15, an image reader 16, an auto document feeder (ADF) 17, a printer 18, an image processor 19, an operation panel 20, a facsimile communication unit 23, a network communication unit 24, and the like are connected to the CPU 11 via a bus. The operation panel 20 includes an operating section 21 and a display section 22.

The CPU 11 is based on the OS program and executes middleware, application programs, and the like in addition. The CPU 11 also functions as a non-server transit state recognizer 26, user authentication instructor 27, and server operating state determiner 28, which will be described later.

Various programs are stored in the ROM 12, and each function of the multifunction peripheral 10 is implemented by the CPU 11 executing various types of processing in accordance with these programs.

The RAM 13 is used as a work memory for temporarily storing various data and an image memory for storing image data when the CPU 11 executes processing on the basis of the program.

The nonvolatile memory 14 is a memory in which stored contents are not destroyed even when the power supply is turned off (flash memory) and is used for storing various setting information and the like.

The hard disk device 15 is a large capacity nonvolatile storage device and functions as a holder for holding the second print job directly received from the PC 70. Also, various programs and data in addition to image data are stored.

The image reader 16 fulfills the function of optically reading a document and acquiring image data. The image reader 16 includes, for example, a light source that irradiates the document with light, a line image sensor that receives the reflected light and reads one line of the document in the width direction, a moving unit for sequentially moving the reading position for each line in the length direction of the document, an optical path including a lens, a mirror, or the like that guides the reflected light from the document to the line image sensor to form an image, and a conversion unit for converting an analog image signal output from the line image sensor into digital image data, and the like.

The auto document feeder 17 fulfills functions of conveying the documents set on the document platen one by one from the uppermost sheet and making the documents pass through the reading position of the image reader 16, and then discharging the document to a predetermined discharge position. The image reader 16 has a function of reading a document placed on the platen glass and a function of sequentially reading documents conveyed by the auto document feeder 17.

The printer 18 fulfills the function of forming an image according to the image data on the recording paper. Here, the printer 18 has a recording paper conveying device, photosensitive drum, charging device, laser unit, developing device, transfer separation device, cleaning device, and fixing device, and is configured as a so-called laser printer performing image formation by an electrophotographic process. Other methods may be used for image formation. In particular, the printer 18 performs printing based on the first print job and the second print job.

In addition to processing such as enlargement/reduction and rotation of the image, the image processor 19 performs rasterization processing for converting print data to image data, compression and expansion processing of image data, and the like.

The operation panel 20 includes the operating section 21 and the display section 22. The display section 22 functions to display various operation screens and is composed of a liquid crystal display or the like. The operating section 21 includes various types of hard keys such as a start button and a numeric keypad for receiving various operations from the user and a touch screen provided on the display surface of the display section 22. Further, the operation panel 20 receives an input of authentication information of the user at the time of login by the user.

The facsimile communication unit 23 has a function of transmitting and receiving image data to and from a device having a facsimile function through a telephone line.

The network communication unit 24 performs a function of communicating with various external devices in addition to each PC 70, the print server 50, the authentication server 40 through the network. The network communication unit 24, in particular, has a function of receiving the first print job from the print server 50 and a function of directly receiving the second print job from the PC 70 as the second print job receiver.

When receiving the second print job directly from the PC 70 without passing through the print server 50, the non-server transit state recognizer 26 implements a function of recognizing the state in which the print job (second print job) is transmitted to the multifunction peripheral 10 without passing through the print server 50 (hereinafter also referred to as a non-server transit state) in the printing system 2 on the basis of direct printing instruction included in the second print job.

In the case where the non-server transit state recognizer 26 recognizes that the printing system 2 is in a non-server transit state, when the operation panel 20 of the multifunction peripheral 10 receives the user's authentication information, the user authentication instructor 27 implements a function of instructing the authentication server 40 to perform user authentication based on the authentication information, instead of instructing the print server 50 to request the authentication server 40 to perform user authentication based on the authentication information.

When the non-server transit state recognizer 26 recognizes that the printing system 2 is in a non-server transit state, the server operating state determiner 28 has a function of periodically determining whether the print server 50 is operating normally via the network.

Figure 4:
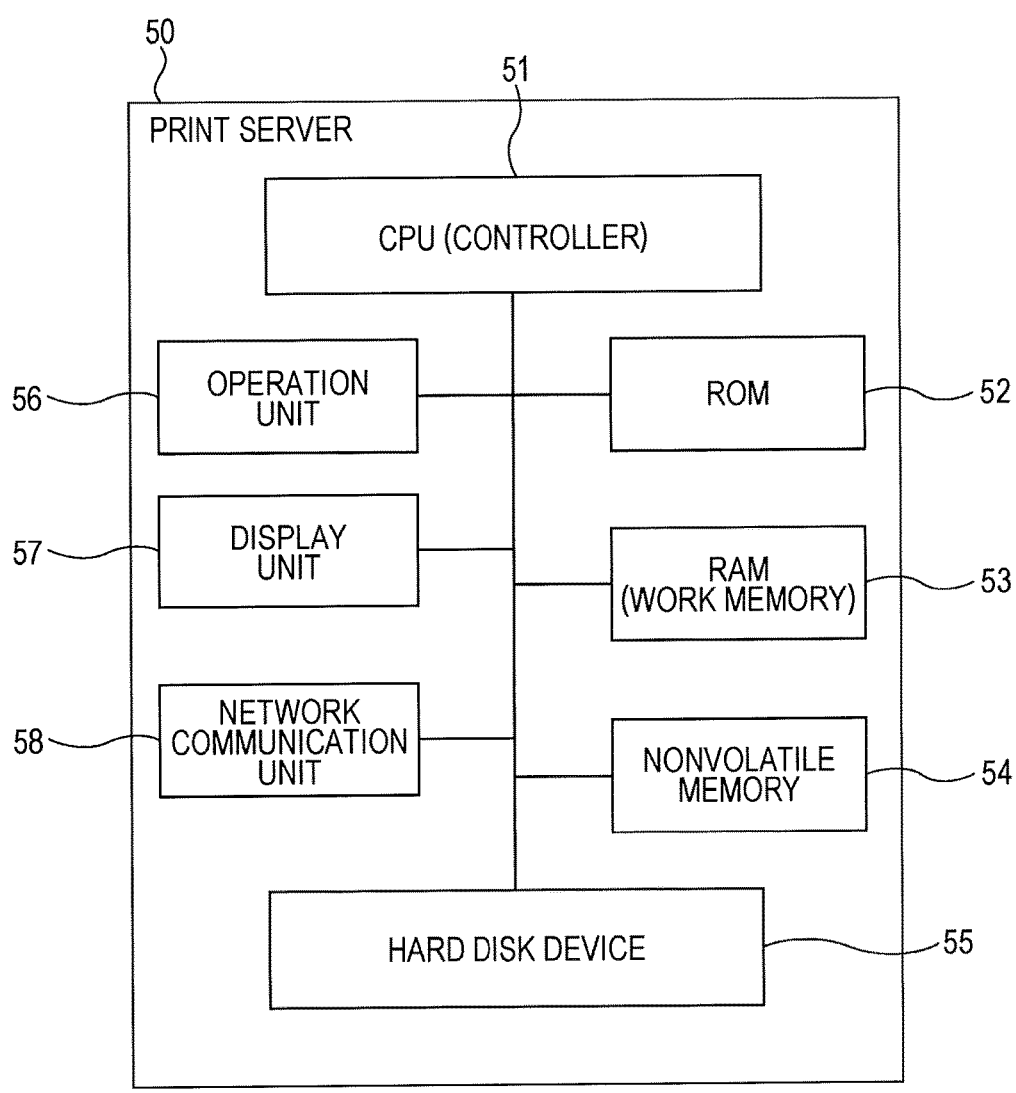
FIG. 4 is a block diagram showing a schematic configuration of a print server.

FIG. 4 is a block diagram showing a schematic configuration of the print server 50. The print server 50 has a CPU 51 as a controller for comprehensively controlling the operation of the print server 50. A ROM 52, a RAM 53, a nonvolatile memory 54, a hard disk device 55, an operation unit 56, a display unit 57, a network communication unit 58, and the like are connected to the CPU 51 via a bus.

The CPU 51 is based on the OS program and executes middleware application programs, and the like in addition. In particular, when there is an instruction, from the multifunction peripheral 10, to request the user authentication from the authentication server 40, the CPU 51 has a function of requesting the authentication server 40 to perform user authentication based on the authentication information included in the request.

Various programs are stored in the ROM 52, and each function of the print server 50 is achieved by the CPU 51 executing various types of processing in accordance with these programs.

The RAM 53 is used as a work memory or the like for temporarily storing various data when the CPU 51 executes processing on the basis of the program.

The nonvolatile memory 54 is a memory in which stored contents are not destroyed even when the power is turned off (flash memory), and is used for storing various setting information and the like.

The hard disk device 55 is a large-capacity nonvolatile storage device, and stores various programs and data. In particular, the hard disk device 55 holds the first print job received from the PC 70. In addition, the hard disk device 55 stores connection information of each MFP (IP address, model information, etc.), information on driver setting, personal panel setting information, restriction information for each user concerning printing (counter etc.), and the like.

The display unit 57 functions to display various operation screens, setting screens, and the like. The display unit 57 is composed of a liquid crystal display or the like. The operation unit 56 fulfills the function of receiving various operations from the user.

The network communication unit 58 functions to communicate with each PC 70, each multifunction peripheral 10, the authentication server 40, and various other external devices through the network. In particular, the network communication unit 58 has a function of receiving the first print job from the PC 70. Further, the network communication unit 58 has a function of transmitting the first print job of the user authenticated by the user authentication to the multifunction peripheral 10 that has issued an instruction to request the authentication server 40 to perform user authentication.

Figure 5:
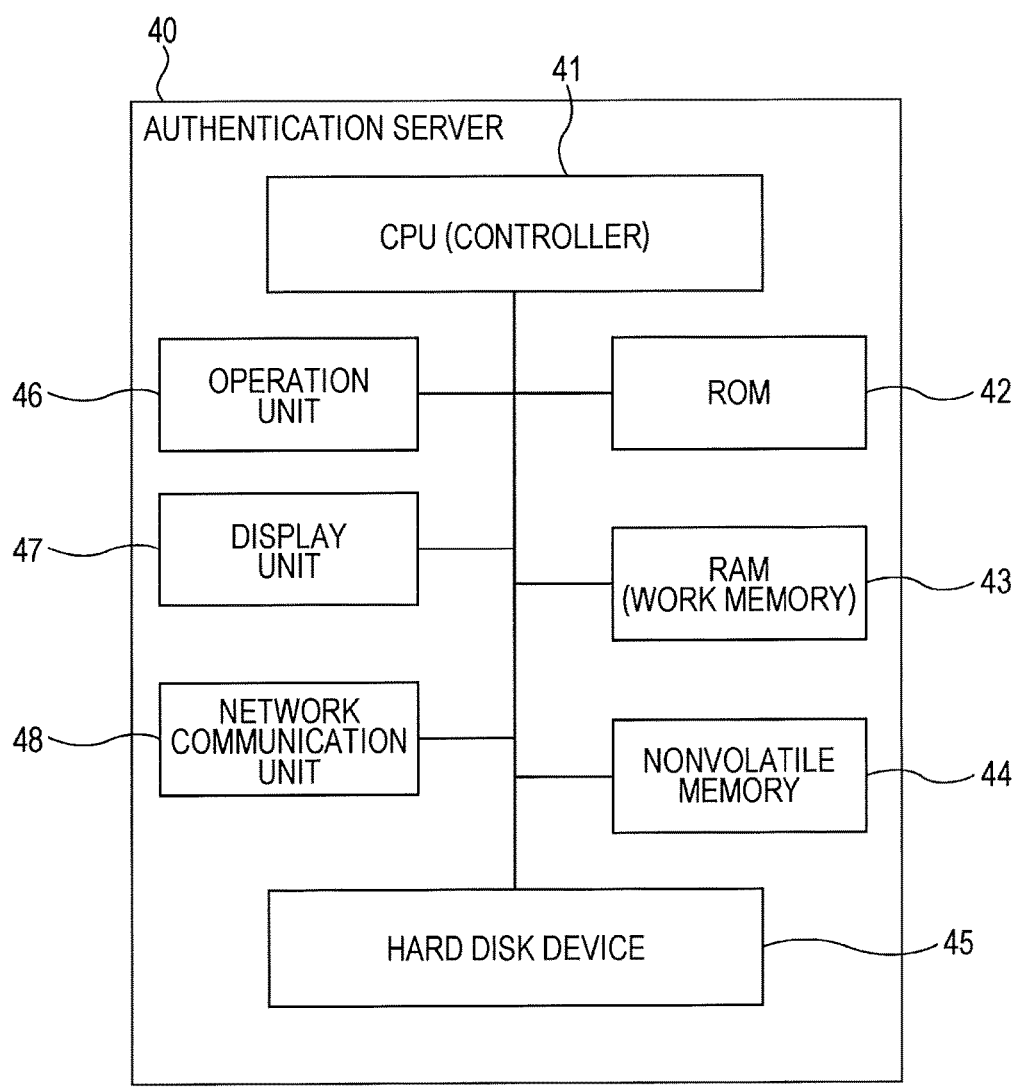
FIG. 5 is a block diagram showing a schematic configuration of an authentication server.

FIG. 5 is a block diagram showing a schematic configuration of the authentication server 40. The authentication server 40 has a CPU 41 as a controller for comprehensively controlling the operation of the authentication server 40. A ROM 42, a RAM 43, a nonvolatile memory 44, a hard disk device 45, an operation unit 46, a display unit 47, a network communication unit 48, and the like are connected to the CPU 41 via a bus.

The CPU 41 is based on the OS program and executes middleware, application programs and the like in addition. In particular, when an instruction to perform user authentication is issued from the print server 50 or the multifunction peripheral 10 as required, the CPU 41 performs user authentication based on the authentication information included in the instruction.

Various programs are stored in the ROM 42, and the respective functions of the authentication server 40 are achieved by the CPU 41 executing various types of processing in accordance with these programs.

The RAM 43 is used as a work memory or the like for temporarily storing various data when the CPU 41 executes processing on the basis of the program.

The nonvolatile memory 44 is a memory in which stored contents are not destroyed even when the power supply is turned off (flash memory), and is used for storing various setting information and the like.

The hard disk device 45 is a large-capacity nonvolatile storage device, and stores various programs and data. In particular, the hard disk device 45 stores user information and the like necessary for performing user authentication according to an instruction received from the print server 50 or the multifunction peripheral 10.

The display unit 47 functions to display various operation screens, setting screens, and the like. The display unit 47 is composed of a liquid crystal display or the like. The operation unit 46 fulfills a function of receiving various operations from the user.

The network communication unit 48 functions to communicate with each multifunction peripheral 10 and the print server 50 via the network. In particular, the network communication unit 48 fulfills the function of receiving an instruction for user authentication from the print server 50 or the multifunction peripheral 10 and transmitting the result of the user authentication to the print server 50 or the multifunction peripheral 10 that is the transmission source of the instruction.

Figure 6:
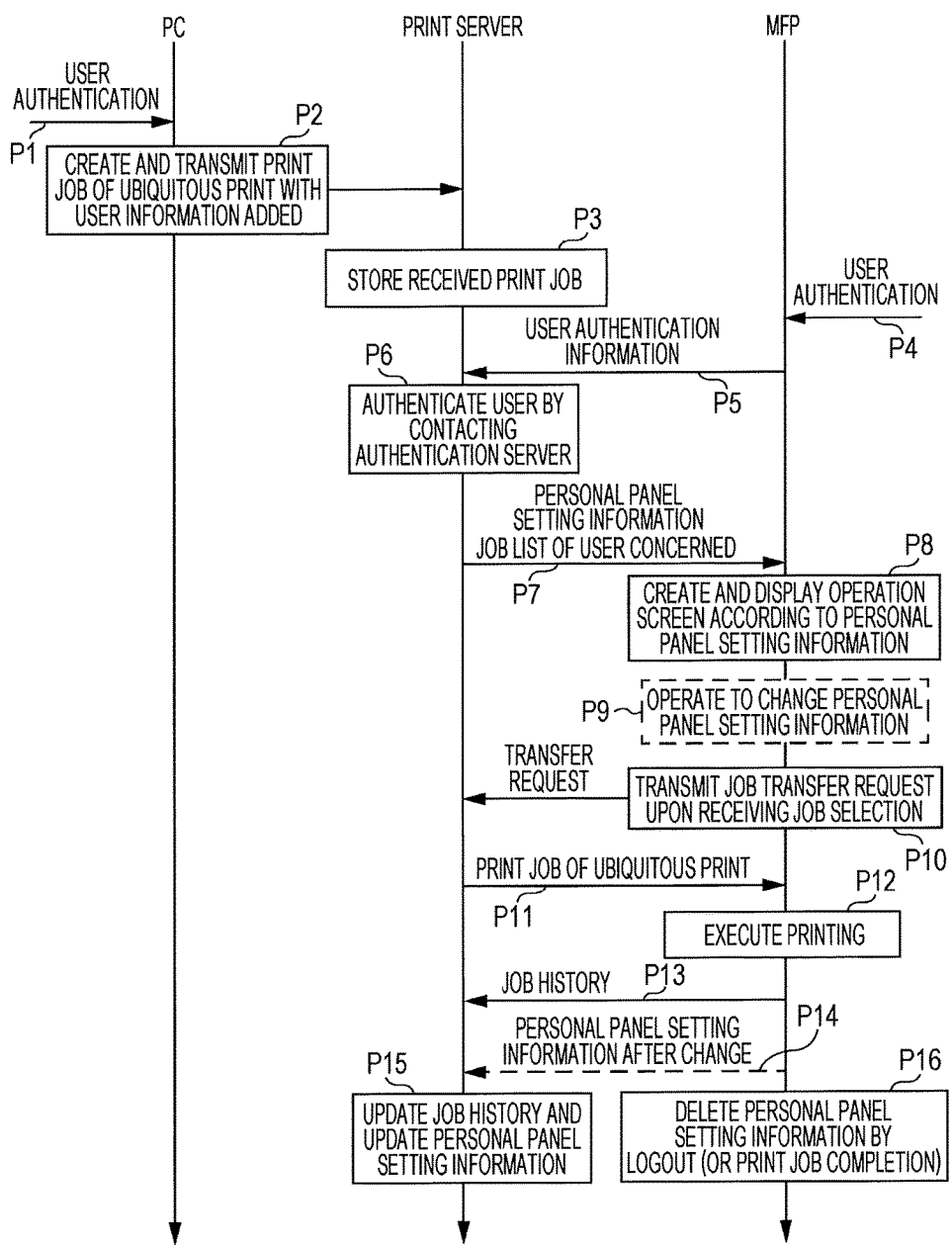
FIG. 6 is a diagram showing a printing sequence when the print server is operating normally.

FIG. 6 shows a printing sequence in the printing system 2 when the print server 50 is operating normally. It is assumed that each PC 70 is exclusive to a user. The server printer driver 90 of the PC 70 receives the user authentication (P1), and then creates a print job including the identification information of the user (first print job) and transmits the print job to the print server 50 upon receiving from the user an instruction to transmit a print job relating to security printing or pull printing requiring a login operation on the multifunction peripheral 10 or the like at the time of output (P2).

The print server 50 which has received the above-mentioned print job, holds the received print job in the folder of the user indicated by the identification information included in the print job (P3). After that, when the user inputs the user authentication information for login at any one of the multifunction peripherals 10 (P4), the multifunction peripheral 10 transmits the input user authentication information to the print server 50 (P5). The print server 50 transmits the received user authentication information to the authentication server 40 to request user authentication (P6).

Upon receiving a response from the authentication server 40 indicating that the user authentication is successful, the print server 50 reads personal panel setting information of a user authenticated by the user authentication (referred to as a login user) from the hard disk device 55, and transmits the personal panel setting information and the list of print jobs stored in the folder of the login user to the multifunction peripheral 10 that is the transmission source of the user authentication information (P7).

The multifunction peripheral 10 that has received the information temporarily stores the received personal panel setting information and customizes and displays the operation screen in accordance with the personal panel setting information (P8). Further, when receiving the changing operation of the personal panel setting information from the login user, the multifunction peripheral 10 changes the temporarily stored personal panel setting information in accordance with the changing operation and also changes the operation screen being displayed (P9).

Thereafter, the multifunction peripheral 10 displays a list of print jobs received from the print server 50, and transmits the transfer request of the selected print job to the print server 50 upon receiving a print job selection and printing instruction from the user (P10). The print server 50 that has received the transfer request transmits the data of the print job requested by the transfer request to the multifunction peripheral 10 requesting the data (P11).

The multifunction peripheral 10 that has received the print job executes printing (P12). Thereafter, the result of execution (job history) etc. of the print job is transmitted to the print server 50 (P13). When the changing operation for the personal panel setting information has been received, the personal panel setting information after the change (in this case, only the changed portion), the user information on the login user, and the information on the multifunction peripheral 10 (the model etc.) are transmitted to the print server 50 (P14). When the user logs out (when the execution of the print job is completed), the multifunction peripheral 10 deletes the personal panel setting information of the user who has logged out from itself (P16).

The print server 50 updates the job history and the counter of the restriction information or the like held by itself based on the job history received from the multifunction peripheral 10. When having received the personal panel setting information from the multifunction peripheral 10, the print server 50 updates the personal panel setting information corresponding to the multifunction peripheral 10 and corresponding to the user indicated by the received user information by using the received personal panel setting information after change (P15).

In this manner, when the print server 50 is functioning, so-called ubiquitous printing is performed, and the multifunction peripheral 10 to which the login operation has been performed instructs the print server 50 to request the authentication server 40 to perform user authentication.

Next, processing corresponding to the case where the print server 50 is down will be described.

When the print server 50 is down, the PC 70 directly transmits a print job including personal panel setting information and user information to the multifunction peripheral 10. In order to do so, it is necessary to acquire a program of a local printer driver that can transmit a print job (second print job) directly to the multifunction peripheral 10 and install the program in the PC 70. Further, the printer driver of the PC 70 needs to obtain personal panel setting information of the user. The procedure will be described below.

Figure 7:
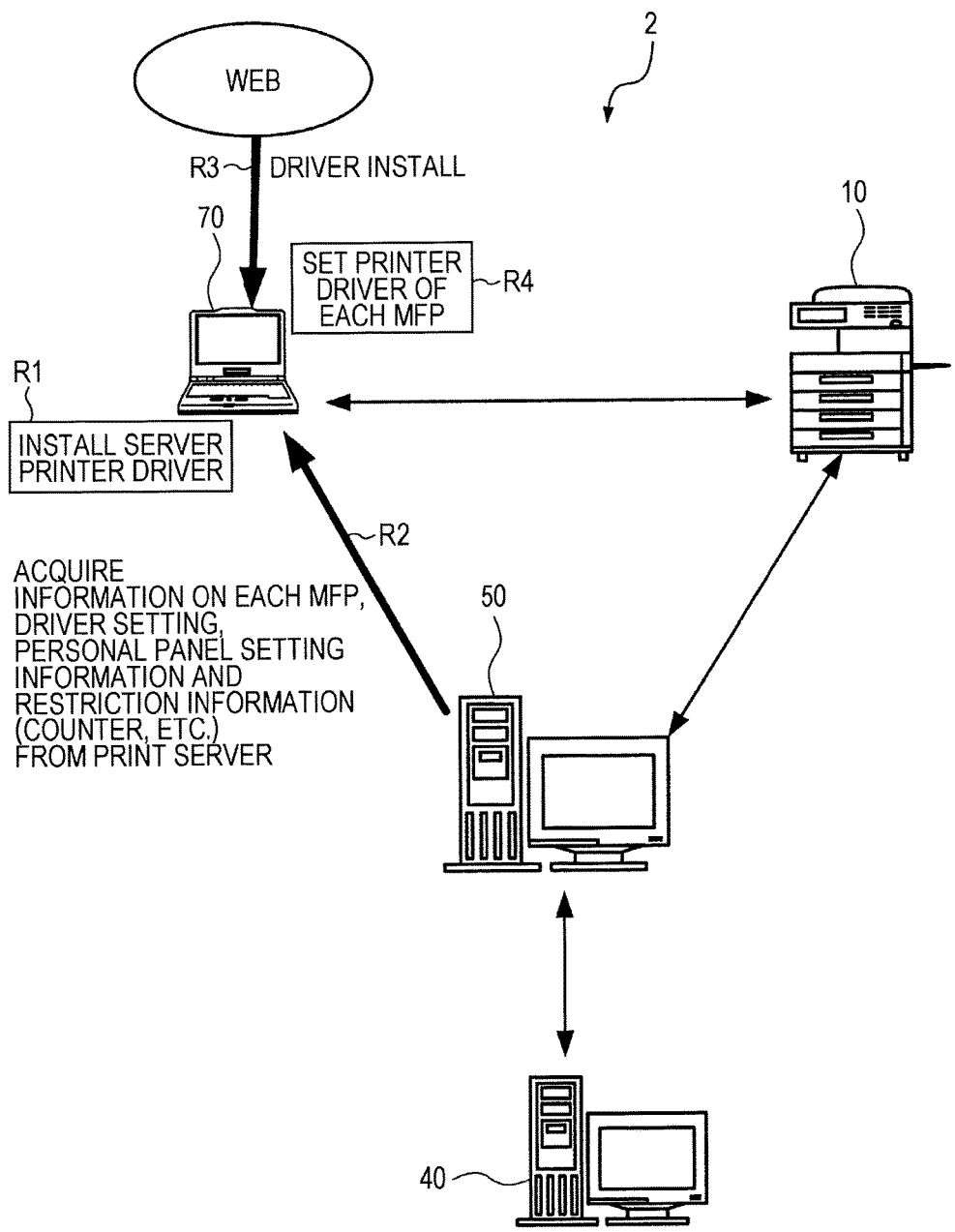
FIG. 7 is a diagram showing how the PC obtains and sets a local printer driver of the multifunction peripheral.

FIG. 7 shows how the PC 70 acquires and sets the local printer driver 91 of the multifunction peripheral 10. When the server printer driver 90 is installed in the PC 70 (R1), the server printer driver 90 acquires information of all multifunction peripherals 10 (MFP information) on the network from the print server 50 (R2).

After that, in the background processing, the server printer driver 90 searches for the program of the local printer driver 91 of each model indicated by the MFP information obtained from the print server 50 on the Web and downloads the program, thereby installing the program in the PC 70 (R3). Further, the server printer driver 90 sets each local printer driver 91 to be usable at any time by using the information such as the IP address of each multifunction peripheral 10 acquired from the print server 50 (R4). The local printer driver 91 subordinated to the server printer driver 90, and the server printer driver 90 can add any information to the print job created by the local printer driver 91.

Next, a printing sequence when the print server 50 is down (referred to as printing sequence A) will be described with reference to FIG. 8. First, the server printer driver 90 of the PC 70 checks whether the print server 50 is usable based on the communication state when receiving a printing instruction from the user. Then, when it is determined that communication cannot be performed and the print server 50 cannot be used (is in down) (or when receiving an instruction for direct printing without passing through the print server 50 from the user), the server printer driver 90 transfers the management authority on number limitation of sheets or the like from the print server 50 to the server printer driver 90 and creates a second print job for instructing directly the multifunction peripheral 10 to perform printing using the subordinate local printer driver 91. The second print job includes personal panel setting information, user identification information, and non-server transit mode information (direct printing instruction indicating that an instruction is issued directly to the multifunction peripheral 10 to perform printing without passing through the print server 50).

It should be noted that the non-server transit mode information may be always added to the print job as a bit indicating whether the system is in the non-server transit state, and may be information added to the print job only when the system is in the non-server transit state or may be information added to the print job only when the system is not in the non-server transit state. As long as the multifunction peripheral 10 that receives the information can determine whether the state is the non-server transit state, the form of the information is not restricted.

Figure 8:
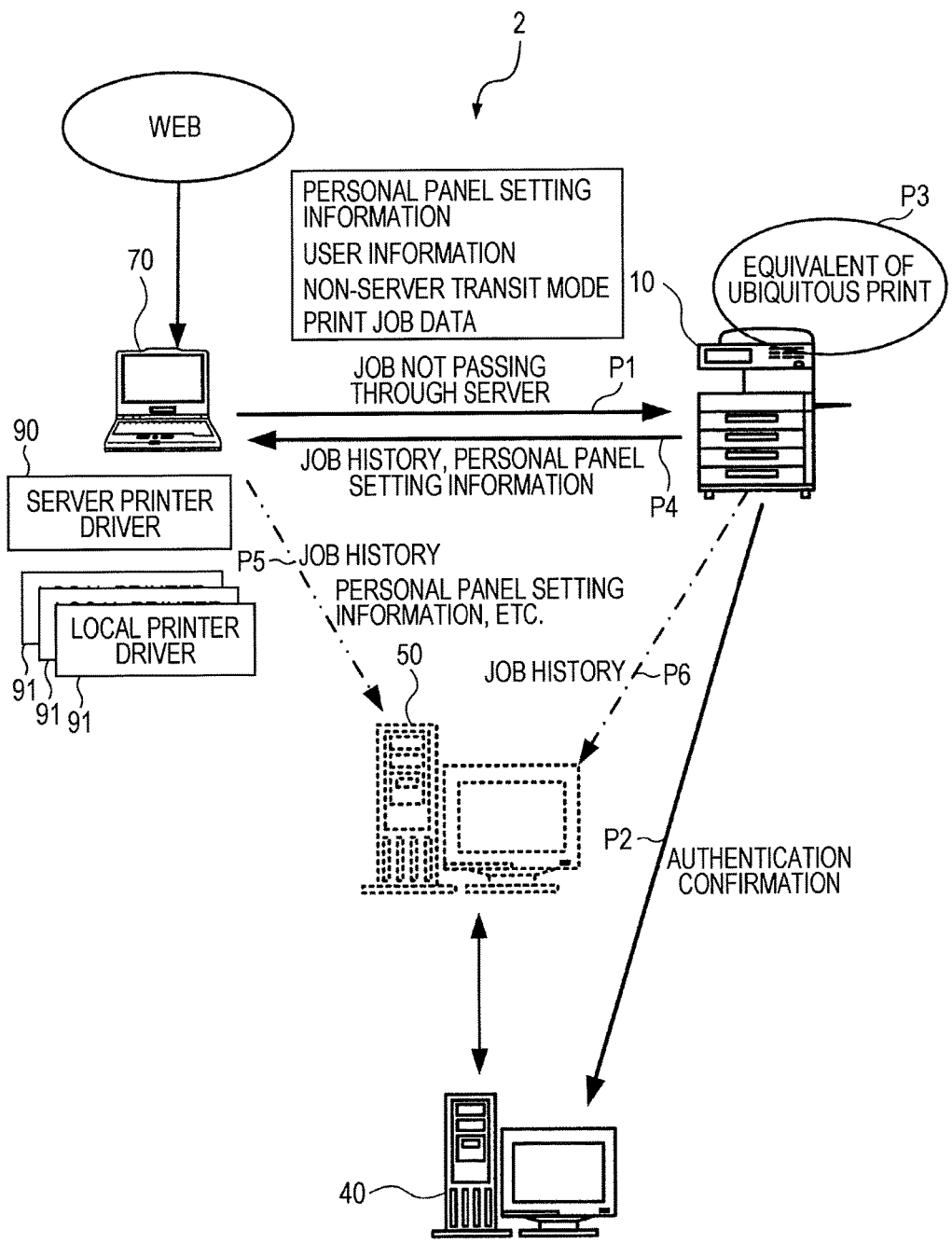
FIG. 8 is a diagram showing the printing sequence when the print server is down.

The server printer driver 90 transmits the second print job to all the multifunction peripherals 10 targeted by these local printer drivers 91 (or to the designated number of the multifunction peripherals 10 with high priorities) by using all the local printer drivers 91 subordinated to the server printer driver 90 after checking the upper limit of the number of printed sheets and the restriction of color setting (FIG. 8, P1).

Upon receiving the second print job including the non-server transit mode information and the user identification information, each of the multifunction peripherals 10 stores the data of the print job in the authentication print box of the user indicated by the received user identification information. Also, the received user identification information and personal panel setting information are stored in association with each other. If there is no corresponding authentication print box, a new one is made.

Upon receiving the second print job, each of the multifunction peripherals 10 recognizes that the printing system 2 is in a non-server transit state in which the above print job is transmitted to the multifunction peripheral 10 without passing through the print server 50, based on the non-server transit mode information included in the second print job. To be specific, the multifunction peripheral 10 sets a flag indicating a non-server transit state.

The multifunction peripheral 10 that has received the login operation using the IC card, the ID and the password from the user confirms whether the non-server transit state flag has been set, and when the non-server transit state flag is set, instead of instructing the print server 50 to request the authentication server 40 to perform user authentication based on the authentication information, the multifunction peripheral 10 directly instructs the authentication server 40 to perform the user authentication based on the user authentication information acquired from the IC card or the like (FIG. 8, P2).

When the user authenticated by the user authentication logs in, the multifunction peripheral 10 uses the personal panel setting information stored in association with the user information of the user who has logged in so as to change the operation screen to a customized screen for the user (FIG. 8, P3). As a result, the arrangement and setting state of the buttons on the operation screen are the same as those in the case of ubiquitous printing via the print server 50, and the user can be provided with the same operability as when performing ubiquitous printing via the print server 50. Note that the multifunction peripheral 10 to which the user logs in and which carries out printing is considered as an output machine.

The multifunction peripheral 10 of the output machine displays a list of print jobs stored in the authentication print box of the login user and receives selection of the print job. The multifunction peripheral 10 executes the selected print job. After printing, the multifunction peripheral 10 checks the state of the print server 50, and if the print server 50 is restored and in operation, the multifunction peripheral 10 sends management information (job history etc.) and personal panel setting information to the print server 50. On the other hand, if access to the print server 50 is impossible, the management information and the personal panel setting information (in the case of having been changed) are transmitted to the server printer driver 90 of the login user's PC 70, and thereafter the multifunction peripheral 10 resets the flag indicating the non-server transit state so as to cancel the recognition of the non-server transit state, and deletes the personal panel setting information (FIG. 8, P4).

The server printer driver 90 updates the current management information (such as the number of printed sheets of the user) by using the received management information so that the management information can be used next time. Further, when personal panel setting information is received from the multifunction peripheral 10, personal panel setting information is updated according to the received personal panel setting information.

The server printer driver 90 checks the state of the print server 50 when the user intends to execute the print job next time, and when the connection can be made, the server printer driver 90 sends the updated management information held by the PC 70 to the print server 50 (FIG. 8, P5).

On the other hand, the multifunction peripheral 10 of the output machine monitors whether the print server 50 is restored, and when it becomes possible to access the print server 50, the multifunction peripheral 10 transmits the management information held by itself to the print server 50 (FIG. 8, P6).

The print server 50 merges and integrates the management information acquired from the server printer driver 90 of the PC 70 and the management information acquired from the multifunction peripheral 10 of the output machine on the basis of the time stamp or the like into the latest state and updates the management information relating to the multifunction peripheral 10 of the output machine and the user who has executed printing.

Next, another method in which the server printer driver 90 of the PC 70 acquires and sets the local printer driver 91 to be available will be described.

Figure 9:
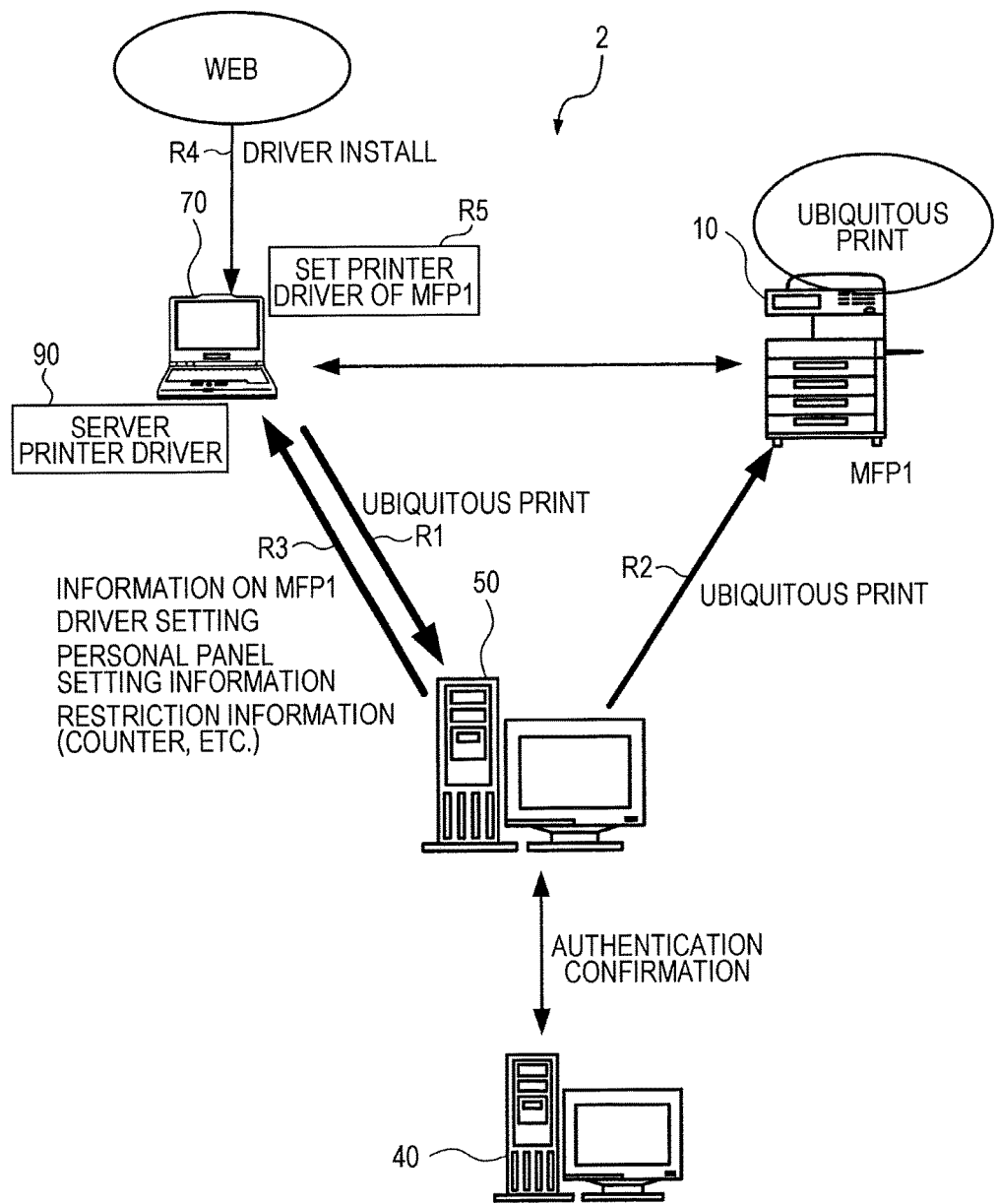
FIG. 9 is a diagram showing how the PC obtains and sets the local printer driver of the multifunction peripheral when performing ubiquitous printing.

In the example of FIG. 7, when the server printer driver 90 is installed, the local printer drivers 91 are acquired from the Web and set for all the multifunction peripherals 10 on the network. In the example shown in FIG. 9, when the ubiquitous printing is executed, the local printer driver 91 is acquired and set for the multifunction peripheral 10 of the output machine.

That is, the user transmits a print job of ubiquitous printing to the print server 50 from the PC 70 (R1), and for example, logs in to the MFP1 and carries out printing of the print job (R2).

At this time, the print server 50 transmits the IP address information, the device model information of the MFP1 and the user information of the user who logged in to the MFP1 and the personal panel setting information on the MFP1 of the user to the server printer driver 90 in the PC 70 of the transmission source of the print job executed by the MFP1 (R3).

The server printer driver 90 of the PC 70 which has received the above information searches for the program of the local printer driver 91 for the MFP1 on the Web in the background processing, and downloads the program, thereby installing the program in the PC 70 (R4). Further, the server printer driver 90 sets the local printer driver 91 for the MFP1 to be available at any time by using information such as the IP address of the MFP1 acquired from the print server 50 (R5).

After that, when the print server 50 is down, printing is basically performed in the same manner as the printing sequence A described with reference to FIG. 8. However, the PC 70 transmits the print job only to the MFP corresponding to the local printer driver 91 already installed and set. For example, in the case where only the local printer driver 91 of the MFP1 has been installed when the print server 50 receives an instruction to send a print job while being in down, the PC 70 uses the local printer driver 91 for the MFP1 to transfer the print job to only the MFP1.

Modification Example

In the printing sequence A shown in FIG. 8, when having completed the execution of the second print job, the multifunction peripheral 10 cancels the recognition of the non-server transit state. However, when recognizing that the printing system 2 is in a non-server transit state, the multifunction peripheral 10 periodically determines whether the print server 50 is operating normally, and may maintain recognition of the non-server transit state until determining that the print server 50 is normally in operation. Thereafter, when determining that the print server 50 is operating normally, the multifunction peripheral 10 cancels the recognition of the non-server transit state.

When the second print job that has not been executed remains in the multifunction peripheral 10 after the recognition of the non-server transit state is canceled, the multifunction peripheral 10 instructs the print server 50 to request the authentication server 40 to perform user authentication based on the user's authentication information, instead of directly instructing the authentication server 40 to perform user authentication based on the authentication information, when receiving a login operation for executing the second print job (user's authentication information). Upon receiving the information that the user is authenticated by the authentication server 40, the multifunction peripheral 10 performs printing based on the second print job including identification information of the same user as the authenticated user.

Also, in P2 of the printing sequence A shown in FIG. 8, the multifunction peripheral 10 that received the login operation directly instructs the authentication server 40 to perform user authentication based on the user authentication information acquired by the login operation. At this time, the multifunction peripheral 10 may notify the authentication server 40 that the printing system 2 is in a non-server transit state.

Upon receiving the notification of the printing system being in the non-server transit state, the authentication server 40 periodically determines whether the print server 50 is operating normally, and performs user authentication according to an instruction for user authentication from the multifunction peripheral 10 until the determination is made that the print server 50 is operating normally. After that, when determining that the print server 50 is operating normally, the authentication server 40 instructs the multifunction peripheral 10 to request the authentication server 40 via the print server 50 to perform user authentication.

When receiving an instruction from the authentication server 40 to request user authentication from the authentication server 40 via the print server 50, the multifunction peripheral 10 cancels the recognition of the non-server transit state.

In the case where the second print job which has not been executed remains in the multifunction peripheral 10 after the recognition of the non-server transit state is canceled, when receiving a login operation for executing the second print job (user authentication information), the multifunction peripheral 10 instructs the print server 50 to request the authentication server 40 to perform user authentication based on the user's authentication information instead of instructing directly the authentication server 40 to perform user authentication based on the authentication information. Upon receiving the information that the user has been authenticated by the authentication server 40, the multifunction peripheral 10 performs printing based on a second print job including identification information of the same user as the authenticated user.

Next, processing executed by each of the PC 70 and the multifunction peripheral 10 will be described.

Figure 10:
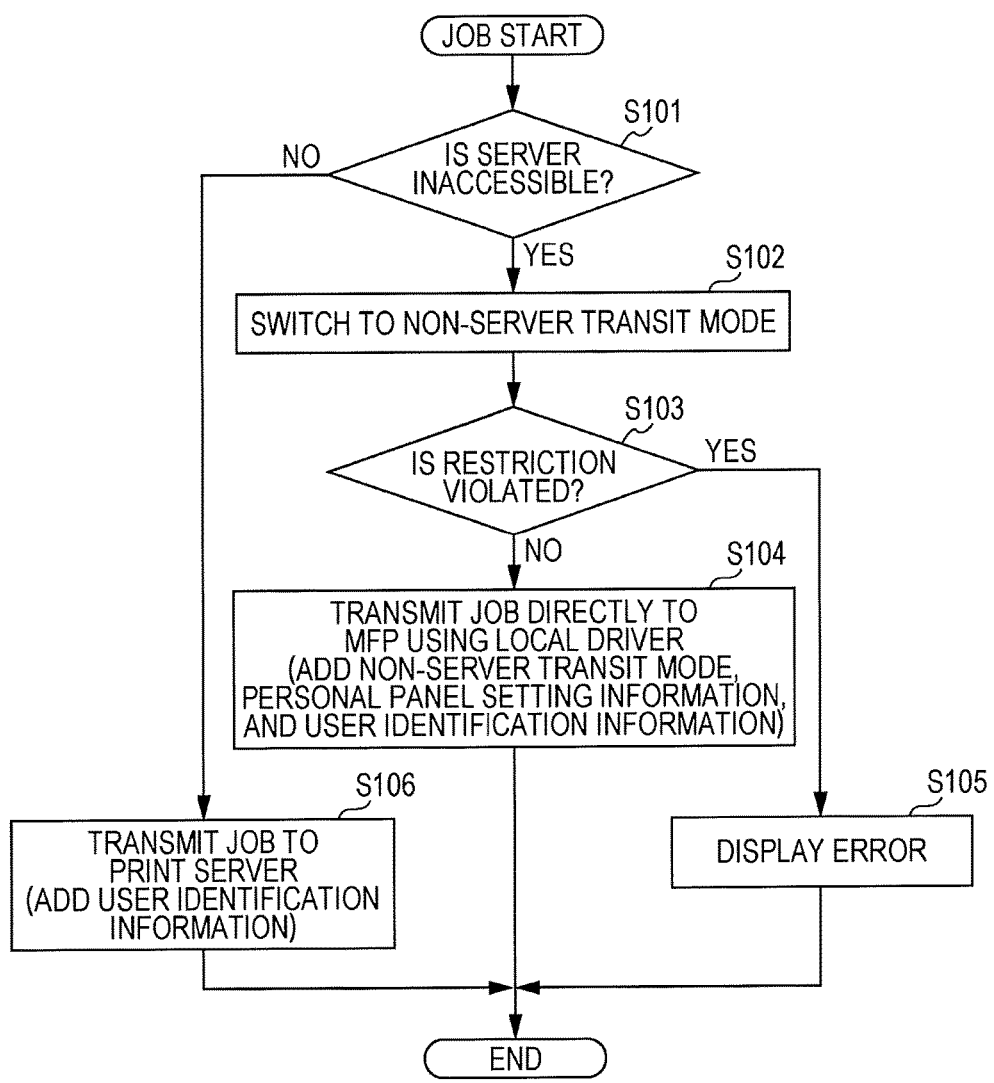
FIG. 10 is a flowchart showing processing of a server printer driver in the PC.

FIG. 10 is a flowchart showing processing of the server printer driver 90 in the PC 70. The server printer driver 90 of the PC 70 checks whether the print server 50 is usable on the basis of the communication state when receiving an instruction to create and transmit a print job from the user (step S101). When the print server 50 can be accessed (step S101; No), a print job of ubiquitous printing (user identification information is added and personal panel setting information is not added) is created and transmitted to the print server 50 (step S106), and this processing is terminated.

When the print server 50 cannot be accessed (step S101; Yes), the mode is switched to the non-server transit mode in which limitation of the number of sheets and the like are controlled by the PC 70 (step S102), and it is checked whether restriction of the upper limit of the number of printed sheets or restriction of color setting is violated in the current print job (step S103).

When the current print job violates the restriction (step S103; Yes), an error display is performed (step S105), and the present processing is terminated. When the current print job does not violate the restriction (step S103; No), a print job (second print job) to be sent directly to the MFP is created using the local printer driver 91, and the user identification information of the user who has logged in to the PC 70 and the personal panel setting information of the user are added to the print job, which is transmitted to the target MFP thereafter (step S104), and then the present processing is terminated. If there are a plurality of local printer drivers 91, all the local printer drivers 91 are made to create and transmit print jobs.

Also, the non-server transit mode switched in step S102 is canceled immediately after the step S105 in the case where step S105 is executed, and is canceled when receiving the notification of the executed print job (job history etc.) or when step S101; No is determined in the next processing in the case where step S104 is executed.

Figure 11:
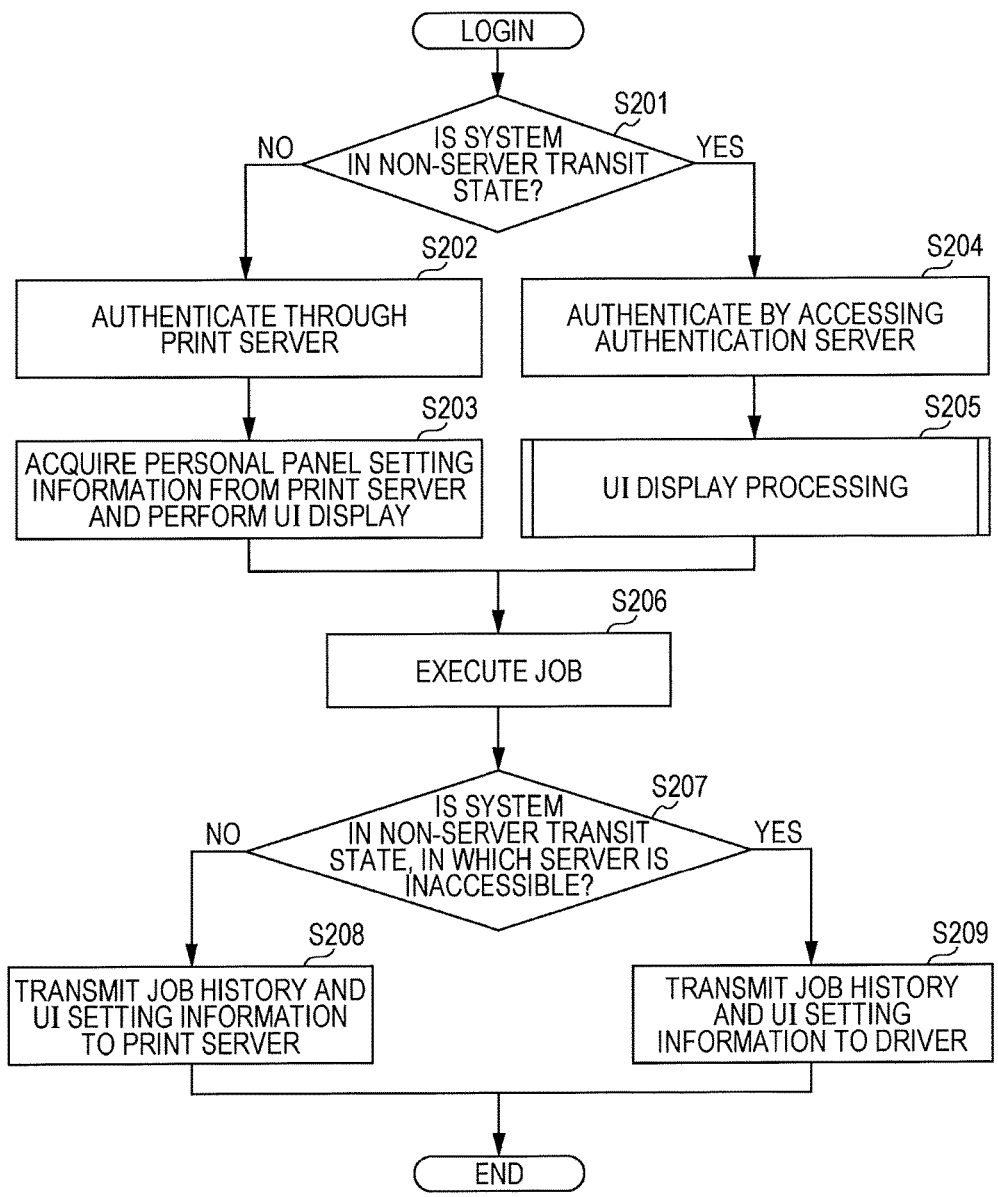

FIG. 11 is a flowchart showing processing performed by the multifunction peripheral 10 when a user logs in. When the user logs in, first, whether the non-server transit state flag is set is examined (step S201). When the non-server transit state flag is not set (step S201; No), user authentication is performed by the authentication server 40 via the print server 50 (step S202), and when the authentication is successful, the personal panel setting information is acquired from the print server 50, and then an operation screen (UI) whose setting has been changed according to the information is displayed (step S203), followed by advancement of the processing to step S206.

When the non-server transit state flag is set (step S201; Yes), the multifunction peripheral 10 directly accesses the authentication server 40 to perform user authentication (step S204). When the authentication becomes successful, an operation screen (UI) whose setting has been changed using the personal panel setting information of the login user is displayed (step S205), and the processing proceeds to step S206.

Thereafter, the print job selected from the job list is executed (step S206), and when the execution of the print job is completed, it is determined whether the printing system 2 is in a non-server transit state and the print server 50 cannot be currently accessed (step S207).

If the printing system 2 is in a non-server transit state, in which the print server 50 is inaccessible (step S207; Yes), the job history (execution result of the job) and the personal panel setting information (only the changed portion) are transmitted to the server printer driver 90 of the transmission source of the executed print job (step S209), and the present processing is terminated.

When the printing system 2 is not in the non-server transit state, in which the print server 50 is inaccessible (step S207; No), the job history and the personal panel setting information are transmitted to the print server 50 (step S208), and the present processing is terminated.

Figure 12:
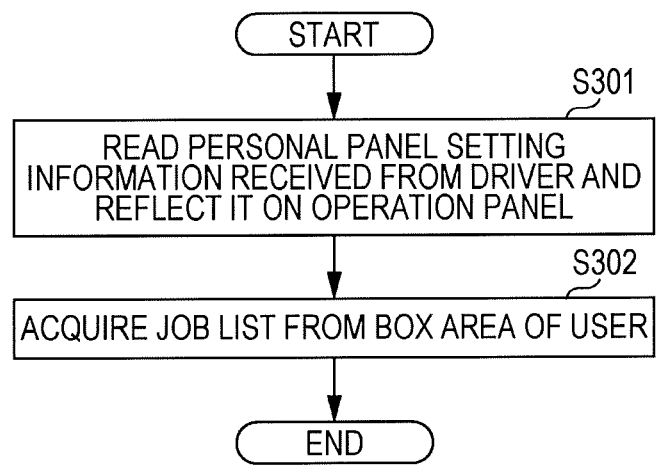
FIG. 12 is a flowchart showing details of step S205 in FIG. 11.

FIG. 12 shows details of step S205 in FIG. 11. The multifunction peripheral 10 reads the personal panel setting information of the login user, which has been received from the server printer driver 90 of the PC 70 together with the print job and is held, and displays the operation screen (UI) whose setting has been changed according to this setting information (step S301). Further, when the job list is displayed, a list of print jobs stored in the authentication print box of the login user is created and displayed (step S302).

As described above, in the printing system 2 according to an embodiment of the present invention, even when the print server goes down or the like, the printing device can be instructed directly to perform printing while maintaining the same security as when the print server is in operation.

Hereinabove, embodiments of the present invention have been described with reference to the drawings, and specific configurations are not limited to those shown in the embodiments, and thus changes and additions within the scope not deviating from the gist of the present invention can be also included in the present invention.

In the printing system 2 according to the present embodiment, the multifunction peripheral 10 displays a list of the second print job including identification information of the same user as the authenticated user after the user is authenticated by the authentication server 40 in the printing sequence A in FIG. 8 or the like. However, upon receiving the information that the user has been authenticated from the authentication server 40, the multifunction peripheral 10 may automatically start printing based on the second print job including identification information of the same user as the authenticated user.

Further, in the modification example, the multifunction peripheral 10 that has received the login operation instructs the authentication server 40 to perform user authentication, and separately from this instruction, the multifunction peripheral 10 notifies that the printing system 2 is in a non-server transit state. However, the multifunction peripheral 10 may notify the authentication server 40 that the printing system 2 is in a non-server transit state by instructing the authentication server 40 to perform user authentication. When receiving directly an instruction to authenticate the user from the multifunction peripheral 10, the authentication server 40 may recognize that the printing system 2 is in a non-server transit state.

Further, when receiving a notification informing that the printing system 2 is in a non-server transit state from the multifunction peripheral 10, the authentication server 40 may give an access right to the multifunction peripheral 10. Alternatively, when determining that the print server 50 is not operating normally, the authentication server 40 may give an access right to the multifunction peripheral 10 at the time of receiving an instruction to perform user authentication from the multifunction peripheral 10. This access right may be valid until user authentication is performed once or may be valid until it is determined that the print server 50 is operating normally.

In addition, by dividing an authentication port for the print server 50 from an authentication port for the multifunction peripheral 10, the authentication server 40 may perform access management with these ports.

Although embodiments of the present invention have been described and illustrated in detail, the disclosed embodiments are made for purposes of illustration and example only and not limitation. The scope of the present invention should be interpreted by terms of the appended claims.

What is claimed is:

1. A printing system comprising:
an information processing terminal;
a print server;
a printing device; and
an authentication server,
wherein the information processing terminal uses a server printer driver for issuing a printing instruction via the print server so as to create a first print job including identification information of a user permitted to issue printing instruction via the print server and transmits the first print job to the print server,
the printing device transmits authentication information of the user to the print server, and instructs the print server to request the authentication server to perform user authentication based on the authentication information, when receiving the authentication information,
the print server, based on the instruction from the printing device, requests the authentication server to perform the user authentication, and transmits, to the printing device, the first print job received from the information processing terminal and including identification information of a same user as the authenticated user when the user is authenticated by the authentication server, and
the printing device performs printing based on the first print job received from the print server,
the information processing terminal comprising:
a hardware processor that creates a second print job including a direct printing instruction indicating that an instruction is issued directly to the printing device to perform printing without passing through the print server and the identification information of the user by using a local printer driver that instructs directly the printing device to perform printing; and
a second print job transmitter that transmits the second print job directly to the printing device by using the local printer driver,
the printing device comprising:
a second print job receiver that receives the second print job directly from the information processing terminal;
the hardware processor that:
recognizes that the printing system is in a non-server transit state in which the second print job is transmitted to the printing device without passing through the print server, based on the direct printing instruction included in the second print job received by the second print job receiver; and
instructs directly the authentication server to perform the user authentication based on the authentication information of the user instead of instructing the print server to request the authentication server to perform user authentication based on the authentication information, when receiving the authentication information of the user, in a case where the hardware processor recognizes that the printing system is in the non-server transit state; and a printer that performs printing based on the second print job including the identification information of the same user as the authenticated user when receiving information that the user has been authenticated from the authentication server as a result of the user authentication which the hardware processor has instructed the authentication server to perform.

2. The printing system according to claim 1, wherein the information processing terminal further comprises the hardware processor that determines whether the print server is operating normally, the hardware processor uses the local printer driver so as to create the second print job when receiving the printing instruction from the user in a case where the hardware processor determines that the print server is not operating normally, and the second print job transmitter transmits the second print job directly to the printing device using the local printer driver.

3. The printing system according to claim 1, wherein the printing device cancels recognition of the non-server transit state made by the hardware processor when having completed the execution of the second print job received directly from the information processing terminal.

4. The printing system according to claim 1, wherein the printing device periodically determines whether the print server is operating normally when the hardware processor recognizes that the printing system is in the non-server transit state, maintains recognition of the non-server transit state made by the hardware processor until determining that the print server is operating normally, cancels recognition of the non-server transit state made by the hardware processor when determining that the print server is operating normally, instructs the print server to request the authentication server to perform user authentication based on the authentication information of the user when receiving the authentication information for executing the unprocessed second print job received from the information processing terminal after canceling the recognition of the non-server transit state, and performs printing based on the second print job including the identification information of the same user as the authenticated user upon receiving the information that the user has been authenticated by the authentication server.

5. The printing system according to claim 1, wherein the printing device notifies the authentication server that the printing system is in the non-server transit state when the hardware processor instructs directly the authentication server to perform the user authentication, the authentication server periodically determines whether the print server is operating normally when notified from the printing device that the printing system is in the non-server transit state, performs the user authentication based on an instruction to authenticate the user from the hardware processor of the printing device until determining that the print server is operating normally, and instructs the printing device to request the authentication server to perform the user authentication via the print server when determining that the print server is operating normally, and the printing device cancels recognition of the non-server transit state made by the hardware processor when receiving an instruction from the authentication server to request the authentication server to perform the user authentication via the print server, instructs the print server to request the authentication server to perform user authentication based on the authentication information of the user when receiving the authentication information for executing the unprocessed second print job received from the information processing terminal after canceling the recognition of the non-server transit state, and performs printing based on the second print job including the identification information of the same user as the authenticated user upon receiving information that the user has been authenticated by the authentication server.

6. The printing system according to claim 1, wherein the information processing terminal acquires the local printer driver when the server printer driver is installed in the information processing terminal.

7. A non-transitory recording medium storing a computer readable program for a server printer driver issuing a printing instruction through a print server, the program being executed in an information processing terminal to cause the information processing terminal to function so as to comprise:

a hardware processor that creates a second print job including a direct printing instruction indicating that an instruction is issued directly to the printing device to perform printing without passing through the print server and an identification information of a user by using a local printer driver that instructs directly the printing device to perform printing, when receiving a printing instruction from the user; and a second print job transmitter that transmits the second print job directly to the printing device by using the local printer driver.

8. The non-transitory recording medium storing a computer readable program according to claim 7, wherein the program causes the information processing terminal to function so as to further comprise the hardware processor that determines whether the print server is operating normally, the hardware processor creates the second print job by using the local printer driver when receiving the printing instruction from the user in a case where the hardware processor determines that the print server is not operating normally, and the second print job transmitter transmits the second print job directly to the printing device using the local printer driver.

9. The non-transitory recording medium storing a computer readable program according to claim 7, wherein the program of the server printer driver causes the information processing terminal to acquire the local printer driver when the program of the server printer driver is installed in the information processing terminal.

10. A non-transitory recording medium storing a computer readable program being executed in a printing device that performs printing based on a printing instruction via a print server, the program causing the printing device to function so as to comprise:

a second print job receiver that receives directly from an information processing terminal, a second print job including a direct printing instruction indicating that an instruction is issued directly to the printing device to perform printing without passing through a print server and identification information of a user;

a hardware processor that:

recognizes that a printing system is in a non-server transit state in which the second print job is transmitted to the printing device without passing through the print server based on the direct printing instruction included in the second print job received by the second print job receiver; and instructs directly the authentication server to perform user authentication based on the authentication information of the user when the printing device receives the authentication information of the user in a case where the hardware processor recognizes that the printing system is in the non-server transit state; and a print instructor that causes the printing device to execute printing based on the second print job including identification information of a same user as the authenticated user when receiving information that the user has been authenticated from the authentication server as a result of the user authentication which the hardware processor has instructed the authentication server to perform.

11. The non-transitory recording medium storing a computer readable program according to claim 10, wherein the program causes the printing device to cancel recognition of non-server transit state made by the hardware processor when the printing device completes the execution of the second print job received directly from the information processing terminal.

12. The non-transitory recording medium storing a computer readable program according to claim 10, the program causing the printing device to perform:

periodically determining whether the print server is operating normally when the hardware processor recognizes that the printing system is in the non-server transit state;

maintaining recognition of the non-server transit state made by the hardware processor until determining that the print server is operating normally;

canceling recognition of the non-server transit state made by the hardware processor when determining that the print server is operating normally;

instructing the print server to request the authentication server to perform user authentication based on the authentication information of the user instead of instructing directly the authentication server to perform user authentication based on the authentication information when receiving the authentication information of the user for executing an unprocessed second print job received by the printing device from the information processing terminal after canceling recognition of the non-server transit state; and executing printing based on the second print job including the identification information of the same user as the authenticated user upon receiving the information that the user has been authenticated by the authentication server.

* * * * *